(12) United States Patent
Oesterle (10) Patent No.: US 7,491,023 B2
(45) Date of Patent: Feb. 17, 2009

(54) TOOL RETRACTION RECEIVING ELEMENT AND ADAPTER FOR POSITIONING THE SAME

(76) Inventor: Hermann Oesterle, Talstrasse 21, 72202 Nagold (DE)

( * ) Notice: Subject to any disclaimer, the term of this patent is extended or adjusted under 35 U.S.C. 154(b) by 529 days.

(21) Appl. No.: 10/547,506

(22) PCT Filed: Mar. 1, 2004

(86) PCT No.: PCT/EP2004/002011

§ 371 (c)(1),
(2), (4) Date: Aug. 31, 2005

(87) PCT Pub. No.: WO2004/078391

PCT Pub. Date: Sep. 16, 2004

(65) Prior Publication Data

US 2006/0147288 A1    Jul. 6, 2006

(30) Foreign Application Priority Data

Mar. 1, 2003    (DE) ................... 103 09 015

(51) Int. Cl.
*B23B 31/10* (2006.01)

(52) U.S. Cl. ................. 409/234; 408/239 R; 279/9.1; 219/635; 219/647; 29/447

(58) Field of Classification Search .......... 409/232, 409/234; 408/238, 239 R, 239 A; 279/9.1, 279/156; 219/635, 647, 649; 29/447, 800, 29/281.1

See application file for complete search history.

(56) References Cited

U.S. PATENT DOCUMENTS

| | | | | |
|---|---|---|---|---|
| 1,285,589 A * | 11/1918 | Barnes | ...................... | 76/108.6 |
| 1,502,528 A * | 7/1924 | Reulbach | .................... | 279/103 |
| 2,407,471 A * | 9/1946 | Burk | ........................... | 279/103 |
| 2,755,117 A * | 7/1956 | Armitage | ................... | 403/378 |
| 3,397,615 A | 8/1968 | Meinke | | |
| 3,678,632 A * | 7/1972 | Eversole et al. | ............ | 451/342 |
| 4,266,895 A * | 5/1981 | Lewis | ......................... | 409/232 |
| 4,668,138 A * | 5/1987 | Carter | ........................ | 409/234 |
| 4,817,972 A * | 4/1989 | Kubo | ........................... | 279/42 |
| 5,035,556 A * | 7/1991 | Lamotte et al. | ............ | 409/218 |
| 5,127,780 A * | 7/1992 | Massa | ........................ | 409/234 |
| 5,992,860 A * | 11/1999 | Marquart | .................... | 279/102 |
| 6,035,512 A | 3/2000 | Cook | | |
| 6,061,917 A * | 5/2000 | Graf | ............................. | 33/201 |
| 6,161,309 A * | 12/2000 | Cook | .......................... | 34/395 |
| 6,186,712 B1 | 2/2001 | Senzaki | | |
| 6,216,335 B1 * | 4/2001 | Freyermuth | .................. | 29/701 |

(Continued)

FOREIGN PATENT DOCUMENTS

DE    10 08 085 B    5/1957

(Continued)

*Primary Examiner*—Daniel W Howell
(74) *Attorney, Agent, or Firm*—Roylance, Abrams, Berdo & Goodman, L.L.P.

(57) ABSTRACT

A tool retraction receiving element includes a receiving section (3) for receiving a tool (15) and a clamping section (9) for clamping the tool retraction receiving element (1) in a tool receiving carrier. The receiving section (3) for the tool (15) and the clamping section (9) of the tool retraction receiving element (1) overlap in the longitudinal direction. An adapter positions one such tool retraction receiving element.

20 Claims, 6 Drawing Sheets

U.S. PATENT DOCUMENTS

| | | | |
|---|---|---|---|
| 6,371,705 B1 | 4/2002 | Gaudreau | |
| 6,390,482 B1 | 5/2002 | Hanoch | |
| 6,680,466 B2 * | 1/2004 | Rabe | 219/635 |
| 6,701,597 B2 * | 3/2004 | Voss et al. | 29/407.05 |
| 6,722,008 B2 * | 4/2004 | Flick | 29/281.5 |
| 6,755,228 B2 * | 6/2004 | Kelch | 156/499 |
| 6,857,177 B2 * | 2/2005 | Taylor | 29/447 |
| 6,861,625 B1 * | 3/2005 | Haimer et al. | 219/607 |
| 7,060,951 B2 * | 6/2006 | Haimer et al. | 219/635 |
| 7,278,194 B2 * | 10/2007 | Pfau | 29/407.1 |
| 2001/0024020 A1 | 9/2001 | Rabe | |
| 2003/0057202 A1 * | 3/2003 | Maxson | 219/635 |

FOREIGN PATENT DOCUMENTS

| | | |
|---|---|---|
| DE | 196 38 808 A1 | 3/1998 |
| DE | 10121743 A1 * | 11/2002 |
| DE | 102 25 839 A1 | 12/2003 |
| EP | 1 004 378 | 5/2000 |
| JP | 11129107 | 5/1999 |
| JP | 2000334622 | 12/2000 |
| JP | 2001219320 | 8/2001 |
| WO | WO 01/89758 A1 | 11/2001 |
| WO | WO 02/18093 A1 | 3/2002 |
| WO | WO 2004/078391 A3 | 9/2004 |

* cited by examiner

TOOL RETRACTION RECEIVING ELEMENT AND ADAPTER FOR POSITIONING THE SAME

FIELD OF THE INVENTION

The present invention relates to a tool retraction receiving element with a receiving section for retracting a tool and a clamping section for clamping the tool retraction receiving element in a tool receiving carrier. The present invention also relates to an adapter for positioning of the tool retraction receiving element.

BACKGROUND OF THE INVENTION

In conventional shrink-fit tool holders, the holding section for shrinking fitting the tool is configured on one end of the shrink-fit tool holder. The clamping section for clamping the shrink-fit tool holder in a tool holder support is configured in the longitudinal direction spaced away from the holding section for the tool on the opposite end of the tool holder. When shrink-fitted tools are being used on a machine tool, for example, a milling machine, lathe, or drilling machine, the surface of the workpiece, which in particular has been machined by cutting, often does not have the desired quality.

SUMMARY OF THE INVENTION

An object of the present invention is to provide a shrink-fit tool holder for an adapter for accommodating a shrink-fit tool holder by which the disadvantages of the prior art can be overcome, especially by which better surface qualities of the machined workpieces can be achieved.

In a shrink-fit tool holder with a holding section for shrink-fitting of a tool and a clamping section for clamping the shrink-fit tool holder in a tool holder support, the object of the present invention is achieved by the receiving or holding section for the tool and the clamping section of the shrink-fit tool holder overlapping in the longitudinal direction, i.e., the receiving section and clamping section having a common axial location. By superposition of the holding section for the tool with the clamping section in the axial direction, short, compact shrink-fit tool holders can be formed which have very high stiffness, especially in the radial direction. This stiffness in turn leads to better surface quality of the machined workpieces. Moreover, the service life of the tools can be increased by the short structural length of the shrink-fit tool holder.

One preferred embodiment of the shrink-fit tool holder of the present invention is characterized in that the overlapping is more than 50% of the total length of the shrink-fit tool holder. For many applications, it is sufficient if the overlapping is more than 30%. In this way deflection of the shrink-fit tool holder in the radial direction is avoided in operation.

Another preferred embodiment of the shrink-fit tool holder of the present invention is characterized in that the overlapping extends essentially over the entire length of the clamping section for clamping the shrink-fit tool holder in a tool holder support. At least one partial section with an extension which is approximately 5% of the total length of the shrink-fit tool holder can be configured without overlapping.

Another preferred embodiment of the shrink-fit tool holder of the present invention is characterized in that the holding section for shrinking fitting of the tool is formed by a through hole extending over the entire length of the shrink-fit tool holder. The through hole preferably has a circular cross section, but can also have a polygonal cross section.

Another preferred embodiment of the shrink-fit tool holder of the present invention is characterized in that the through hole on its end opposite the clamping section has a centering section with a widened inside diameter. The centering section is used to hold and center, before shrink fitting, one end of the tool which is to be shrink-fitted.

Another preferred embodiment of the shrink-fit tool holder of the present invention is characterized in that following the clamping section, a circumferential groove is formed having a rectangular cross section. The circumferential groove interacts with a cam configured on a clamping nut and used to release the tool holder after machining.

Another preferred embodiment of the shrink-fit tool holder of the present invention is characterized in that on the end of the shrink-fit tool holder, opposite the clamping section and following the circumferential groove, a conical section is formed which widens toward the circumferential groove. The conical section facilitates placement of a tensioning nut.

Another preferred embodiment of the shrink-fit tool holder of the present invention is characterized in that the clamping section has the shape of a cone. The dimensions of the cone are preferably standardized, for example, according to DIN 6499.

Another preferred embodiment of the shrink-fit tool holder of the present invention is characterized in that the clamping section has the shape of a circular cylinder. The configuration of the clamping section is matched to the shape of the tool holder support.

An adapter of the present invention for use with the above described shrink-fit tool holder is characterized by a depression with dimensions matched to the end of the clamping section of the shrink-fit tool holder. The depression can be configured as a conical or cylindrical depression, and ensures that almost the entire outer circumferential surface of the shrink-fit tool holder is accessible from the outside to deliver heat to the shrink-fit tool holder. The depth of the depression is chosen such that tilting of the tool holder in place is reliably prevented. With inductive heating and an electrically conductive, especially metallic adapter, the vertical dimension of the depression is comparatively small, for example, 1 to 5 mm, especially approximately 2 mm.

One preferred embodiment of the adapter of the present invention is characterized in that the adapter tapers toward the shrink-fit tool holder. Tapering simplifies the placement of the heating element on the adapter.

Another preferred embodiment of the adapter of the present invention is characterized in that the adapter is configured with at least two parts and comprises a base adapter and an adapter insert on which the depression and/or the tapering is/are configured. This arrangement facilitates use of the base adapter for shrink-fit tool holders of different sizes. The different shrink-fit tool holders together with the pertinent adapter inserts can be used with one and the same base adapter. The base adapter in turn is matched to the heating device to be used.

Another preferred embodiment of the adapter of the present invention is characterized by a central threaded hole in which a threaded bolt is held with a turning capacity. A free end of the bolt forms a stop for the tool when the shrink-fit tool holder is positioned on the adapter. By turning the threaded bolt the shrink-fitting depth of the tool can be continuously adjusted.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings which form a part of this disclosure.

DETAILED DESCRIPTION OF THE INVENTION

Figure 1:
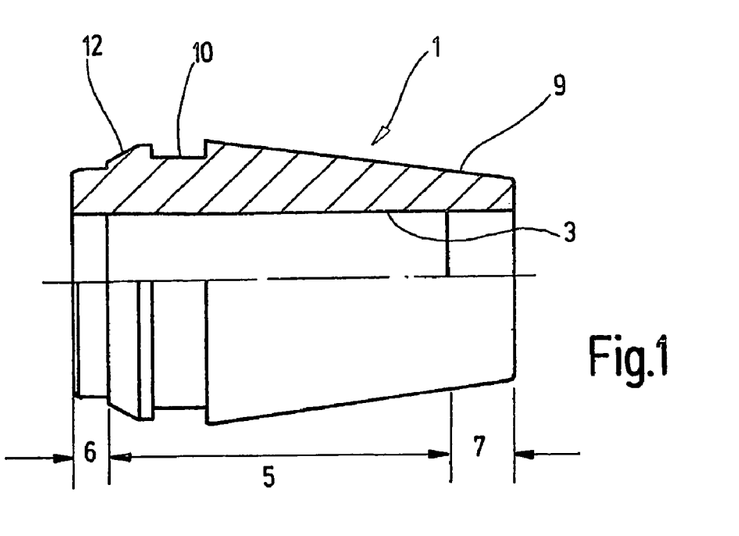
FIG. 1 is a side elevational view in section of a shrink-fit tool holder according to a first embodiment of the present invention.
Figures 2, 3:
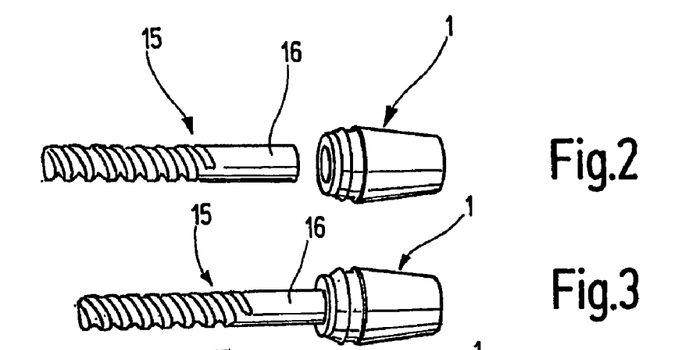
FIG. 2 is a perspective view of the shrink-fit tool holder of FIG. 1, before a tool is shrink-fitted.
FIG. 3 is a perspective view of the shrink-fit tool holder of FIG. 1, when the tool is being centered.
Figure 4:
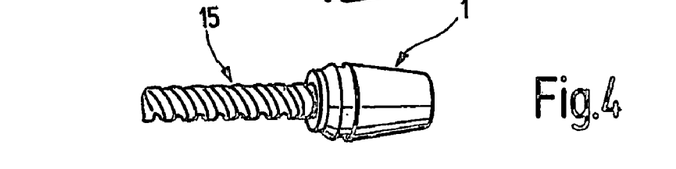
FIG. 4 is a perspective view of the shrink-fit tool holder of FIG. 1, with the tool shrink-fitted.

FIG. 1 shows a shrink-fit tool holder 1 having a through hole 3 for holding the tool shaft 16 of a tool 15 (see FIGS. 2 to 4). The through hole 3 has a section 5 with a constant inside diameter. On one end the section 5 undergoes transition into a centering section 6 with a slightly widened inside diameter. On the other end, the section 5 undergoes transition into a section 7 with a likewise slightly widened inside diameter.

The shrink-fit tool holder 1 is configured as a rotationally symmetrical holder body. On its outer circumference the tool holder has a conical clamping section 9 tapering toward the free end. The wider end of the clamping section 9 is adjoined by a circumferential groove 10 used to hold the cam of a clamping screw (not shown). The circumferential groove 10 in the axial direction is followed by a conical section 12 tapering away from the circumferential groove 10. The conical section 12 is used to ensure simple positioning or sliding over of the clamping nut with the cam. For this purpose, the largest outside diameter of the conical section 12 is larger than the pertinent inside diameter of the clamping nut with the cam.

FIG. 2 shows the tool 15, for example, a drill, shortly before shrink-fitting into the shrink-fit tool holder. In FIG. 3, the free end of the tool shaft 16 for its centering is inserted into the centering section 6 of the shrink-fit tool holder 1. In FIG. 4 the shaft 16 of the tool 15 is shrink-fitted into the through hole 3.

Figures 5, 6, 7:
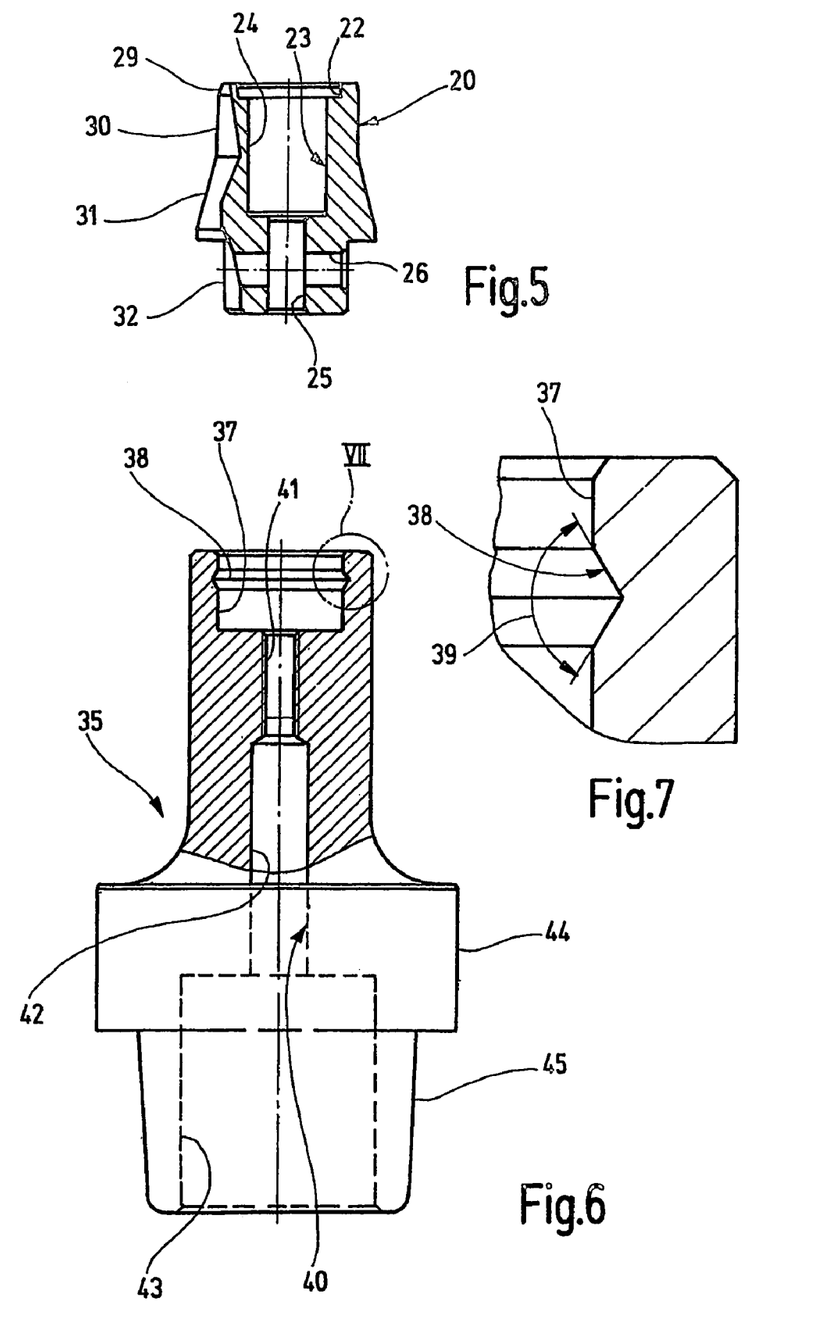
FIG. 5 is a side elevational view in section of an adapter insert according to an embodiment of the present invention for positioning of the shrink-fit tool holder of FIG. 1.
FIG. 6 is a side elevational view in partial section of a base adapter according to an embodiment of the present invention for use with the adapter insert of FIG. 5.
FIG. 7 is an enlarged, side elevational view in section of detail VII of the base adapter of FIG. 6.

FIG. 5 shows an adapter insert 20 in a longitudinal section. The adapter insert 20 is configured rotationally symmetrical, and comprises a depression 22 used to hold the free end of the clamping section of the shrink-fit tool holder shown in FIG. 1. The depression 22 can be a cylindrical depression. In FIG. 5 the depression 22 is made slightly conical to facilitate the placement of the shrink-fit tool holder.

The adapter insert 20 is equipped with a through hole 23. The hole 23 comprises one hole section 24 and another hole section 25, the hole section 24 having a larger inside diameter than the hole section 25. In the hole section 25, the hole 23 is penetrated by a through hole 26 which extends perpendicular to the through hole 23. The hole 26 is used to hold a pretensioned ball which is used in turn to fix the adapter insert 20 in a base adapter 35 (see FIG. 6). The through hole 23 extends centrally through the adapter insert 20, and at the same time forms the longitudinal axis of this rotationally symmetrical component.

On its outer circumference the adapter insert 20 comprises four sections 29, 30, 31, and 32. The section 29 is located in the area of the depression 22, and is slightly conical, the section 29 tapering toward its free end. The section 30 follows the conical section 29, and has a constant outside diameter. The section 31 adjoins the section 30 and widens from the section 30 in a conical shape. The section 32 follows the section 31 and has a somewhat smaller outside diameter than the section 30.

FIG. 6 shows the base adapter 35 in a longitudinal section which is likewise configured rotationally symmetrical. The base adapter 35 is equipped with a central holding hole 37 with an inside diameter matched to the outside diameter of the section 32 of the adapter insert 20. In this way insertion of the adapter insert 20 with the section 32 into the holding hole 37 of the base adapter 35 is facilitated.

A circumferential groove 38 with a triangular cross section is formed in the holding hole 37. As shown in the enlarged sectional view in FIG. 7, the groove flanks of the triangular groove 38 are configured at an angle 39 to one another.

As is shown in FIG. 6, the holding hole 37 is part of a central through hole 40 defining the longitudinal axis or axis of rotation of the base adapter 35. The through hole 40 comprises three additional sections 41, 42, and 43 with different inside diameters, proceeding from the holding hole 37. The hole section 41 has the smallest and the hole section 43 has the largest inside diameter. In addition, an inside thread is formed in the hole section 41. The outside the base adapter 35 has a section 44 with a widened outside diameter.

Figure 8:
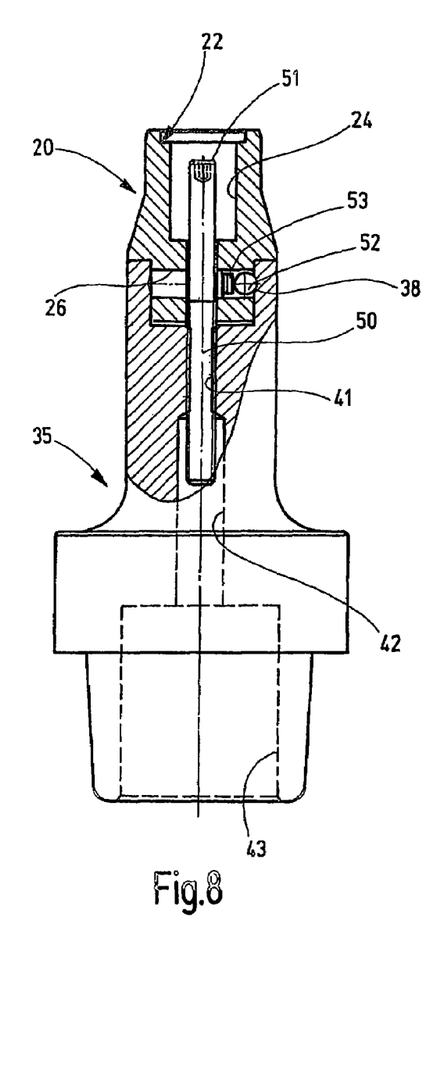
FIG. 8 is a side elevational view in partial section of the base adapter of FIG. 6, with the adapter insert of FIG. 5 in place.

FIG. 8 shows the base adapter 35 from FIG. 6 with the adapter insert 20 from FIG. 5 in place. As is to be seen, the section 32 of the adapter insert 20 is held in the holding hole 37 of the base adapter 35. A threaded bolt 50 is screwed into the section 41 with the inside thread of the base adapter 35. One free end of bolt 50 projects into the section 42 of the through hole 40. The other free end 51 of bolt 50 projects into the hole section 24 of the adapter insert 20. Moreover, in the through hole 26 of the adapter insert 20, a ball 52 is pretensioned using a spring 53. The ball 52 is partially pressed out of the through hole 26 by the spring 53. The part of the ball 52 projecting out of the through hole 26, when the adapter insert 20 is in place in base adapter 35, is held in the groove 38 of the base adapter 35. In this way unwanted loosening of the adapter insert 20 from the base adapter 35 is prevented.

Figure 9:
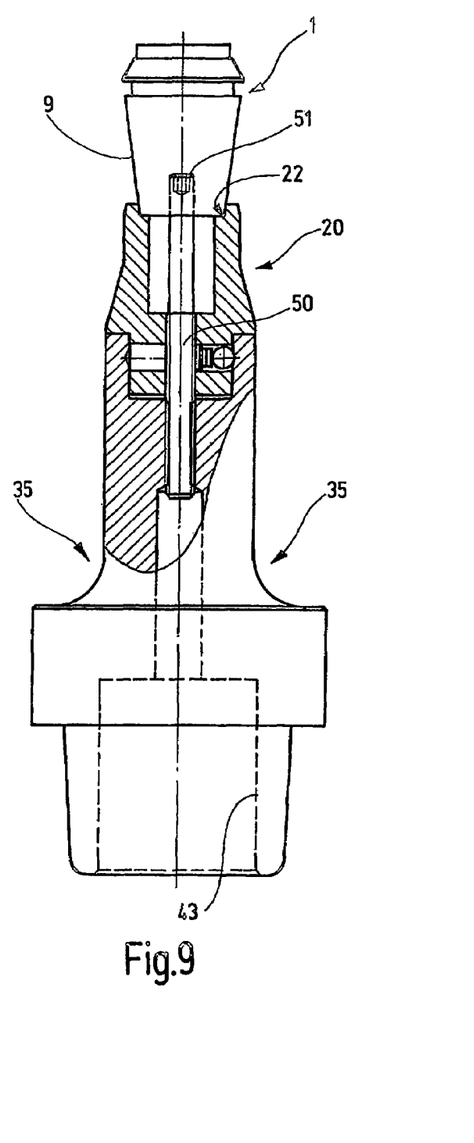
FIG. 9 is a side elevational view in partial section of the adapter of FIG. 8, with the adapter insert of FIG. 5 and the shrink-fit tool holder of FIG. 1 in place.

FIG. 9 shows how the shrink-fit tool holder 1 shown in FIG. 1 is positioned with the free end of the clamping section 9 on the depression 22 of the adapter insert 20. The section 43 of the through hole 40 is used to connect the base adapter 35 to a conventional heater (not shown).

By heating the shrink-fit tool holder of the present invention and by the resulting widening of the through hole 3, the tool shaft 16 of a tool 15 can be reversibly or releasably connected securely to the shrink-fit tool holder 1. The through hole 3 of the shrink-fit tool holder 1 relative to the cylindrical tool shaft 16 is configured smaller by at least approximately 0.01 mm, especially by at least approximately 0.02 mm, than the clamping diameter of the cutting tool 15. The overlap of the inside diameter of the through hole 3 and the outside diameter of the tool shaft 16 is influenced among other factors by the material used. As a result of the change in the volume of solids, which is proportional to the temperature when heated, the inside diameter of the through hole 3 of the shrink-fit tool holder 1 is enlarged. The widening by heating is carried out in the elastic range of the material. Thus, the clamping process can be repeated as often as desired, that is, the process is reversible.

Heating of the tool holder, when the tool shaft is being shrink-fitted into the through hole of the shrink-fit tool holder, takes place in the temperature range from +100 to +380° C., especially +250 to +330° C. In the heated state of the shrink-fit tool holder 1, the optionally supercooled tool shaft 16 can be inserted into the through hole 3. Upon subsequent cooling of the shrink-fit tool holder 1 with the tool shaft 16 inserted to temperatures in the range from −20 to +110° C., the shrink-fit tool holder 1 tries to reach its initial state again. In the process, a clamping pressure is produced on the cylindrical tool shaft 16 in the radial direction by cooling of the shrink-fit tool holder 1. The level of the clamping pressure is determined primarily by the overlap of the outside diameter of the tool shaft 16 with the inside diameter of the through hole 3 of the shrink-fit tool holder 1. Little overlapping results in a low clamping pressure. Extensive overlapping results in a high clamping pressure. The clamping process is reversible and can be repeated any number of times as long as the deformation takes place in the elastic area of the material used.

In the conventional processes, the shrinkage area lies outside the clamping insert. This arrangement has the disadvantage that for each cutting tool clamping shaft diameter, a correspondingly complex and expensive tool holder is needed. The long structural shape moreover has the disadvantage that the radial load of the machining spindle rises significantly. This loading then leads to a loss of stiffness and radial deflection of the machining spindle.

The shrink-clamping system of the present invention does not require expensive, special tool holders, but can be installed in conventional universal draw-in collet chucks or machining spindles with collet chuck holders due to its mating outer configuration. By superposition of the shrinkage area with the clamping area, the shortest cutting tool chucking mechanisms can be accomplished. One major advantage is the maximum radial stiffness of the machining tools. This stiffness in turn results in extremely high surface qualities of the machined workpieces.

The shrinking-clamping process of the present invention takes place directly in the clamping cone. In this way, extremely short clamping of the cutting tools is possible. The clamp insert hole, also designated as the through hole 1, is superimposed by the clamping cone also designated as the clamping section 9. The shrink-fit clamping insert, which is also designated as the shrink-fit tool holder 1, is very inexpensive to produce and can be inserted into any commercial standard collet holder. The shrink-fit tool holder 1 of the present invention compared to conventional clamping techniques permits two to four times higher torque transmission with simultaneously higher radial stiffness.

The shrinking-clamping system of the present invention enables short shrinking-in and shrinking-out times. A tool can be changed in seconds by inductive heating of the shrink-fit tool holder with high energy density. In this way, true running accuracies of the cutting tools of less than 3 µm can be implemented with maximum clamping force and radial stiffness.

The shrink-fitting of a tool shaft into a shrink-fit holder using an adapter of the present invention is described in what follows. First, the base adapter 35 must be connected to a suitable adapter insert 20 which is dependent on the shape and dimensions of the shrink-fit tool holder 1. Then, the adapter which has been preassembled in this way is inserted into the base holder of a shrinking device (not shown). Then, the shrink-fit tool holder 1 is slipped onto the adapter insert 20. An induction coil (not shown) is then centered and fixed over the shrink-fit tool holder 1. After that the tool shaft 16 is inserted into the centering section 6 of the through hole 3, and the shrinkage device is activated.

The through hole 3 of the shrink-fit tool holder 1 is enlarged by the change in volume which is proportional to temperature. As soon as widening of the through hole 3 of the shrink-fit tool holder 1 is greater than the outside diameter of the tool shaft 16, the tool 15 by its own weight falls into the through hole 3. The free end 51 of the threaded spindle 50 forms a stop for the free end of the tool shaft 16. Then, the heat source can be turned off. Due to the cooling which now follows, the shrink-fit tool holder 1 tries to attain its original shape. This reshaping however is prevented by the tool shaft 16. The resulting stress provides for the tool shaft 16 to be held positively and nonpositively in the shrink-fit tool holder 1.

To accelerate the cooling process, the shrink-fit tool holder 1 with the tool shaft 16 located in it can be cooled in a cooling station (not shown).

Figure 10:
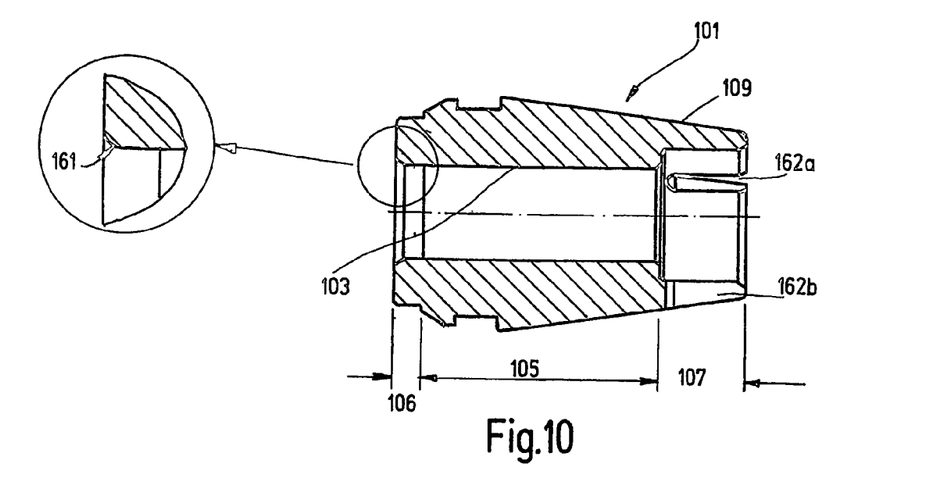
FIG. 10 is a side elevational view in section of a shrink-fit tool holder according to a second embodiment of the present invention.
Figure 11:
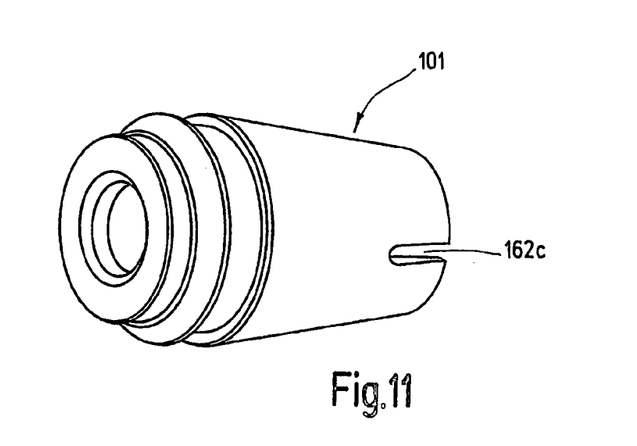
FIG. 11 is a perspective view of the tool holder of FIG. 10.

FIG. 10 shows a second embodiment of a shrink-fit tool holder 101 of the present invention in a longitudinal section. FIG. 11 shows the pertinent perspective view. The receiving or holding section 103 is formed by an opening which extends in the longitudinal direction of the shrink-fit tool holder, in this embodiment by a through hole which extends over the entire length. The end of the opening which is the left end in FIG. 10 and which holds the tool is radially widened. In particular, a radius 161 is molded on this end, as especially shown in the enlargement of the corresponding extract of FIG. 10. The radius 161 is generally less than half the diameter of the holding section 103, especially less than 20% of it, and preferably in the range of one mm or less. In this way, the tool can be easily and precisely inserted into the shrink-fit tool holder 101 without tilting.

On its end facing the clamping section 109, the shrink-fit tool holder 101 has an opening which extends in the longitudinal direction of the shrink-fit tool holder and which forms another section 107. Section 107 has a diameter greater than that of the holding section 103. The opening as in the embodiment shown can be a section of a through hole. It could also be made as a blind hole. The opening is preferably cylindrical in the longitudinal direction, especially circular-cylindrical.

Due to the greater diameter, the wall thickness of the clamping section 109 is reduced in this further section 107, for example, down to a few mm or only 1 mm on the free end. This ensures advantageous energy-storing, and thus, elastic deformation of the clamping section 109. This arrangement is furthermore improved if one or more slots 162a, 162b, 162c are made in the further section 107 which have at least in sections an extension in the axial direction. In this embodiment, three slots 162a, 162b, 162c in the axial direction are uniformly distributed in the circumferential direction. The slots 162a, 162b, 162c can also extend obliquely to the axial direction. Except for the slots 162a, 162b, 162c, the shrink-fit tool holder 101 is rotationally symmetrical relative to its longitudinal axis.

The wall thickness provided in the further section 107 is especially dependent on the materials, the tool dimensions, and the workpiece to be machined. Due to the reduced wall thickness, small differences of the cone angle can also be compensated by elastic deformation of the shrink-fit tool holder 101, and a higher true running accuracy of the overall system is achieved.

Figure 12:
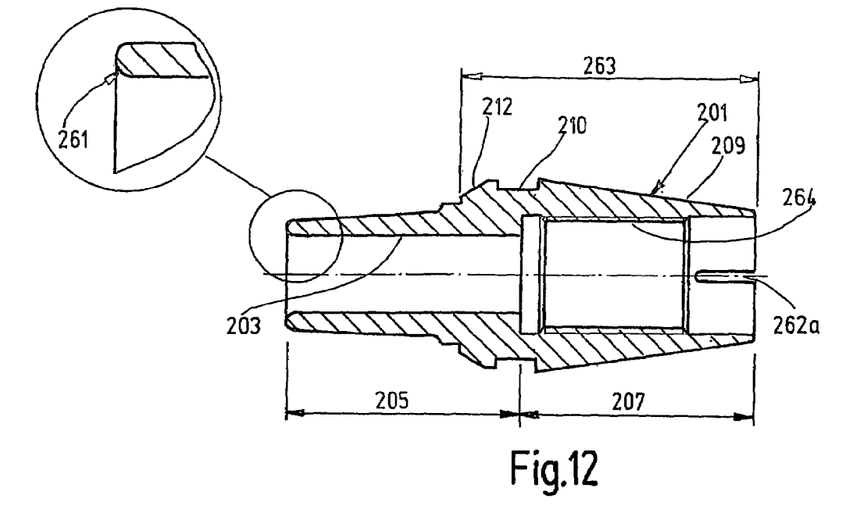
FIG. 12 is a side elevational view in section of a shrink-fit tool holder according to a third embodiment of the present invention.
Figure 13:
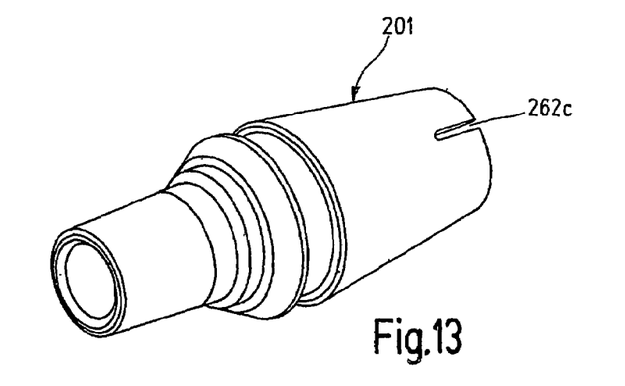
FIG. 13 is a perspective view of the tool holder of FIG. 12.

FIG. 12 shows a third embodiment of a shrink-fit tool holder 201 of the present invention in a longitudinal section. FIG. 13 shows the pertinent perspective view. In the third embodiment, the holding section 205 is offset from the middle to the end which holds the tool, and is overlapped only to a lesser degree by the clamping area 263 comprising the clamping section 209, the groove 210, and the conical section 212. On the end which holds the tool, the holding section 205 can have a centering section as in the first embodiment. Moreover this end has a radius 261 of, for example, 0.1 to 5 mm, especially 0.2 to 3 mm, and preferably 0.4 to 2 mm, for simplified insertion of the tool. The overlap of the holding section 205 with the clamping area 263 is, for example, up to twice the clamping diameter.

On its end facing the clamping section 209, the shrink-fit tool holder 201 has an opening which forms the section 207 and which is part of the through hole. From the end, slots 262a, 262c are configured axially analogously to the second embodiment. A section of the opening set back from the end has an internal thread 264, into which a stop for the tool to be inserted can be precisely positioned. The axial extension of the further section 207 is, for example, twice the magnitude of the diameter of the further section 207. A transition section between the inside thread 264 and the holding section 203 is preferably free of threads.

Especially under unfavorable spatial conditions in the working space between the workpiece clamping area and the cutting tool, this embodiment offers advantages especially for small milling tools, also because the elastically deformable region of the clamping area 263 is larger.

Figure 14:
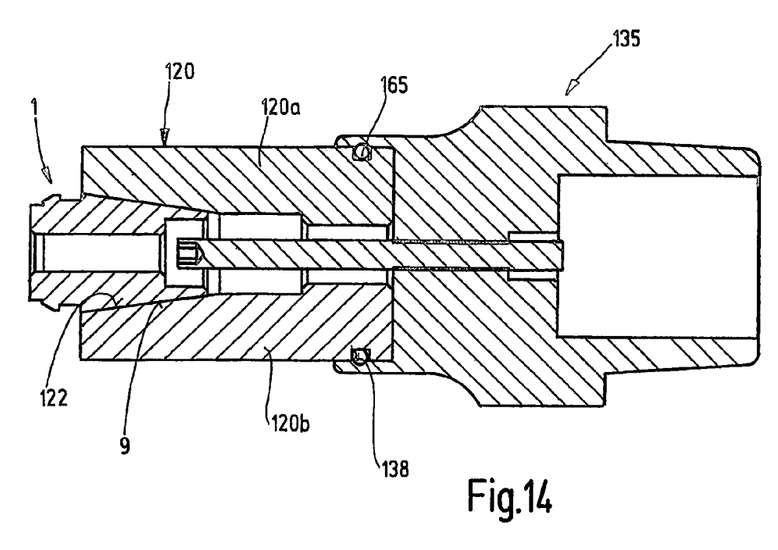
FIG. 14 is a side elevational view in section of an adapter according to another embodiment of the present invention with the shrink-fit tool holder inserted.

FIG. 14 shows a second embodiment of an adapter of the present invention with the inserted shrink-fit tool holder, in a longitudinal section. The second embodiment has a base body 135 and an adapter insert 120. The adapter insert 120 can be assembled from two parts 120a, 120b, the interface running at a right angle to the plane of the drawings of FIG. 14 and parallel to the longitudinal axis of the configuration. Preferably, they are identical parts 120a, 120b. The adapter insert 120 is made of an electrically insulating material, preferably of a fiber-reinforced ceramic, especially of a ceramic reinforced with glass fibers.

The two parts 120a, 120b can be clamped to one another by a preferably closed ring 165. The ring 165 can be made of metal or of a temperature-resistant plastic. The base body 135 on its end facing the adapter insert 120 has a connecting piece with a groove 138 formed on its inside into which the ring 165 can fit.

An adjustment pin which extends through the adapter insert 120 can be inserted or preferably screwed into the base body, preferably centrally. The axial position of the tool can be inserted into the shrink-fit tool holder 1 can be adjusted with precision by the adjustment pin.

The depression 122 which faces the shrink-fit tool holder 1 and holds it extends in the axial direction so far that the clamping section 9 of the shrink-fit tool holder 1 is essentially overlapped. In this way, the clamping section 9 is covered during heating and a change of the surface, for example, by oxidation is thus advantageously prevented. To this end, the conical shape of the depression 122 can be matched to the conical shape of the shrink-fit tool holder 1 such that air is essentially excluded. Moreover, the shrink-fit tool holder 1 is reliably fixed in the adapter insert 120. Furthermore, the shrink-fit tool holder 1 can be easily removed after shrink-fitting by the multipart adapter insert 120. With inductive heating in the electrically insulating adapter insert 120, no current is induced and heat forms in spite of the overlapping of the adapter insert 120 in the shrink-fit tool holder 1.

While various embodiments have been chosen to illustrate the invention, it will be understood by those skilled in the art that various changes and modifications can be made therein without departing from the scope of the invention as defined in the appended claims.

What is claimed is:

1. A shrink fit tool holder, comprising:
a holder body having a longitudinal direction along a longitudinal axis;
a receiving section in said holder body for receiving a tool, said receiving section having a receiving diameter;
a clamping section on said holder body for clamping said body in a tool receiving adapter, said receiving section and said clamping section overlapping in said longitudinal direction;
an opening in said holder body on an end facing said clamping section, said opening extending in said longitudinal direction and forming a further section having a diameter greater than said receiving diameter of said receiving section; and
slots extending axially in said further section in said longitudinal direction.

2. A shrink fit tool holder according to claim 1 wherein overlapping of said receiving section and said clamping section is more than thirty percent of a total length of said holder body.

3. A shrink fit tool holder according to claim 1 wherein overlapping of said receiving section and said clamping section is more than fifty percent of a total length of said holder body.

4. A shrink fit tool holder according to claim 1 wherein overlapping of said receiving section and said clamping section extends essentially over an entire length of said clamping section.

5. A shrink fit tool holder according to claim 1 wherein said receiving section comprises a through hole extending over an entire length of said holder body.

6. A shrink fit tool holder according to claim 5 wherein said through hole comprises a centering section with a widened inside diameter on an end of said holder body opposite said clamping section.

7. A shrink fit tool holder according to claim 1 wherein said holder body comprises a circumferential groove following said clamping section.

8. A shrink fit tool holder according to claim 7 wherein said circumferential groove comprises a rectangular cross section.

9. A shrink fit tool holder according to claim 7 wherein a conical section widens toward said circumferential groove on an end of said holder body opposite said clamping section following said circumferential groove.

10. A shrink fit tool holder according to claim 1 wherein said clamping section has a conical shape.

11. A shrink fit tool holder according to claim 1 wherein said clamping section has a circular cylindrical shape.

12. A shrink fit tool holder according to claim 1 wherein said receiving section comprises a through bore extending along said longitudinal axis over an entire length of said holder body, and has a tool receiving end thereof with a widening radius.

13. A shrink fit tool holder according to claim 1 wherein said further section comprises an inside thread.

14. A shrink fit tool holder according to claim 1 wherein said holder body is positioned in an adapter; and
said receiving section comprises a depression at an end of said clamping section.

15. A shrink fit tool holder according to claim 1 wherein said adapter tapers toward said holder body.

16. A shrink fit tool holder according to claim 14 wherein said adapter comprises two assembled parts that are identical.

17. A shrink fit tool holder according to claim 14 wherein said adapter comprises a central threaded bore holding a threaded bolt with a turning capacity and with a free end forming a stop for a tool.

18. A shrink fit tool holder according to claim 14 wherein said depression extends along said longitudinal axis as far as said clamping section and is essentially overlapped thereby.

19. A shrink fit tool holder according to claim 14 wherein said adapter comprises sections of electrically insulating material.

20. A shrink fit tool holder according to claim 19 wherein said insulating material comprises ceramic.

* * * * *